United States Patent [19]

Sin et al.

[11] 4,419,274

[45] Dec. 6, 1983

[54] NONMETALLIC CATALYST COMPOSITIONS FOR OXIDATION OF AMMONIA AND PROCESS FOR MAKING THE CATALYST

[75] Inventors: Yoon K. Sin, Seoul; Daiuk Kim, Young Il-Koon, both of Rep. of Korea

[73] Assignee: Pohang Iron & Steel Co., Ltd., Pohang City, Rep. of Korea

[21] Appl. No.: 331,216

[22] Filed: Dec. 15, 1981

[30] Foreign Application Priority Data

Dec. 16, 1980 [KR] Rep. of Korea .......................... 4781

[51] Int. Cl.$^3$ .................. B01J 21/04; B01J 23/10; B01J 23/78; B01J 23/84
[52] U.S. Cl. .................................. 502/304; 423/404
[58] Field of Search .......................... 252/462; 423/404

[56] References Cited

U.S. PATENT DOCUMENTS 3,853,790 12/1974 Vosolsobe et al. ............. 423/404 X
3,985,681 10/1976 Sénès et al. ........................ 252/462

Primary Examiner—W. J. Shine
Attorney, Agent, or Firm—Berman, Aisenberg & Platt

[57] ABSTRACT

Nonmetallic catalyst compositions for oxidation of ammonia have the formula of $Fe_2O_3$-$MAl_2O_4$-$Bi_2O_3$-$Ce_2O_3$. Herein, M represents Mg, Mn, Ca, Sr or Ba. $MAl_2O_4$ is a spinel and has a role of carrier as well as that of assistant catalyst. $Fe_2O_3$ acts as main catalyst, $Bi_2O_3$ as assistant catalyst and $Ce_2O_3$ as stabilizer to extend the effective temperature range of the function of catalyst compositions. In the formula, the ratio of each component is as follows:

$Fe_2O_3$: 10–40 wt % of spinel
$Bi_2O_3$: 3.5–6 wt % of spinel
$Ce_2O_3$: 0.5–2 wt % of spinel.

18 Claims, 2 Drawing Figures

NONMETALLIC CATALYST COMPOSITIONS FOR OXIDATION OF AMMONIA AND PROCESS FOR MAKING THE CATALYST

BACKGROUND OF INVENTION

This invention relates to catalysts for oxidizing ammonia gas in contact with air or oxygen to produce nitrogen oxides, more particularly, to the composition of eutectic mixture catalysts comprising ferric oxides, bismuth oxide and other metal oxides. Therein, the ferric oxide and the bismuth oxide are the basic components of the composition.

Conventionally, single or multi-layers of nets of platinum or alloys of the platinum family metals, such as iridium and rhodium have been used as catalysts for oxidizing ammonia to produce nitrogen oxides. However, since the reaction temperature with the catalyst is from 800° to 900° C. and the life of the platinum nets is only ½ or 1 year, expensive platinum is rapidly used. Studies have been undertaken to substitute cheap nonmetallic catalyst for platinum. As a result a single-component catalyst, such as ferric oxide, cobalt oxide, manganese oxide, cupric oxide, vanadium (V) oxide, etc [Ind. Eng. Chem. 44, 1564 (1952), Ind. Eng. Chem. 46, 702–708 (1954), A.I. Chem. Eng. Journal. 11, 318–323 (1955), Chim. Ind. (Millan), 45, 15 (1963), Bul. Soc. Chim. 2042 (1972), J. Cat. 39, 57–72 (1975). U.S. Pat. No. 1952911] and multicomponent catalyst systems, such as ferric oxide-bismuth oxide, molybdenum oxide-bismuth oxide, ferric oxide-cobalt oxide, etc [Discussions Faraday Soc., 8140–8152 (1950), Chemie-Ing-Techn., 39 89–95 (1967), React. Kinet. Cat. Letters, 1, 4. 405–410 (1974), React. Kinet. Cat. Letters, 5,1, 55–60 (1976).], are reported for oxidizing ammonia to produce nitrogen oxides.

Among them, ferric oxide-bismuth oxide and ferric oxide-cobalt oxide have been known to be particularly useful. Although these multi-component catalysts show an oxidizing effect of above 95% in the temperature range of 600° to 800° C., their effective temperature range is very narrow and their mechanical strength is not suitable for industrialization.

Recently, in order to reinforce the mechanical strength of multi-component catalysts, the spinels, such as $CaAl_2O_4$, etc., have been considered as carrier. However, the optimum ratio for components of the composition and stabilizer of nonmetallic catalyst have not been disclosed.

DETAIL DESCRIPTION OF INVENTION

Figure 1:
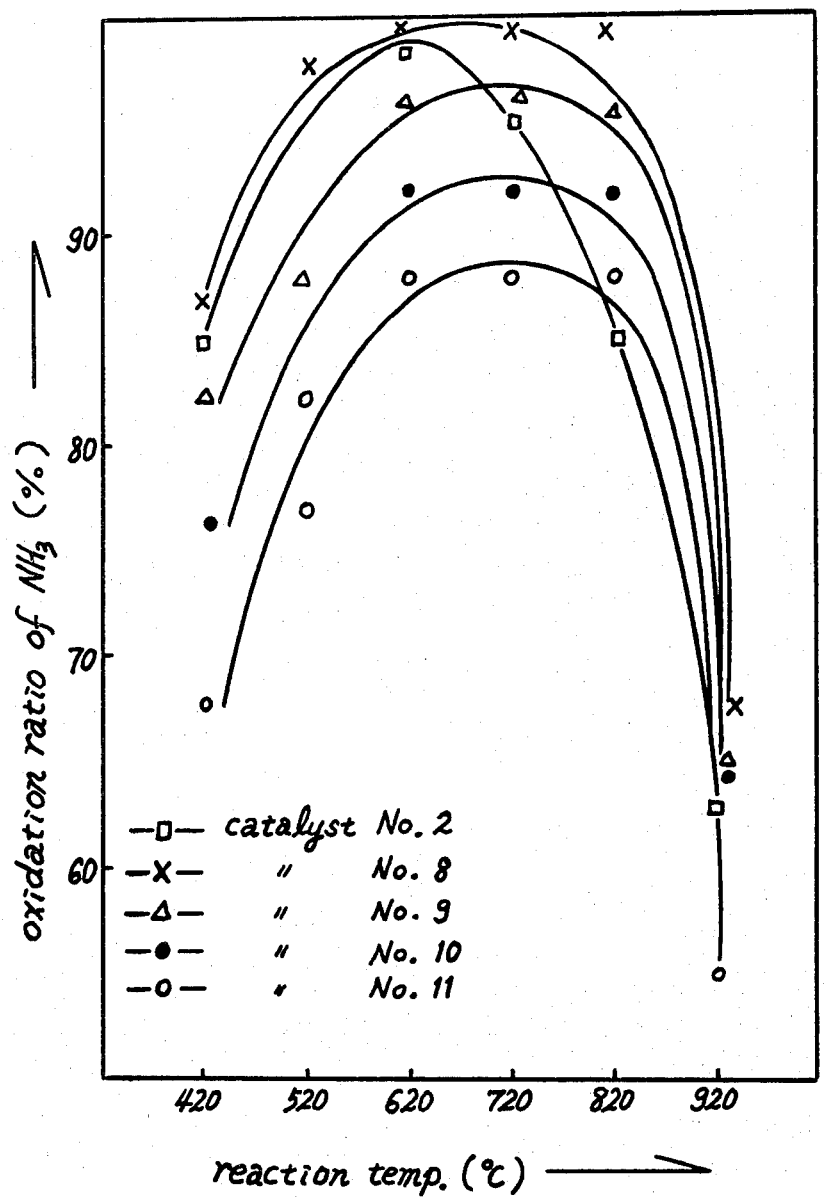
FIG. 1 graphically presents the results of Example 5 and the role of thermal stabilization.

This invention relates to nonmetallic catalyst compositions which are suitable as substitute for platinum catalyst and which improve the mechanical strength and extend the range of the effective temperature of the catalyst to maintain the continuation of the catalyst capacity.

The catalyst compositions of this invention have the formula of $Fe_2O_3$-$MAl_2O_4$-$Bi_2O_3$-$CeO_3$. Herein, $MAl_2O_4$ is a spinel and has role of carrier as well as assistant catalyst. $Fe_2O_3$ acts as main catalyst, $Bi_2O_3$ as assistant catalyst and $Ce_2O_3$ as stabilizer to extend the effective temperature range of the catalyst composition to maintain the duration of the function of catalyst composition. In the above formula, M represents Mg, Mn, Ca, Sr or Ba. Meanwhile, the ratio of each component of this catalyst composition is as follows:

$Fe_2O_3$: 10–40 wt % of spinel
$Bi_2O_3$: 3.5–6 wt % of spinel
$Ce_2O_3$: 0.5–2 wt % of spinel The catalyst composition of this invention can be prepared by several methods.

For example,
1. close combination of each oxide component
2. separate or co-precipitation of each oxide component in its soluble salts.
3. separate or total thermal fusion of each component (but the mechanical strength is low).
4. Suitable combination of the above methods.

Now, we illustrate the typical method of preparation of the catalyst composition of this invention.

Process 1

Salt of sulfuric acid and salt of nitric acid are dissolved in distilled water to form a spinel. Then the mixture is co-precipitated with phenolphthalein (indicator) and $NH_4OH$ or $(NH_4)_2CO_3$ (precipitator). The precipitate is washed with water several times and dried for about 5 hours at 100°–150° C. Then it is sintered for about 5 hours at 1100° C. and rapidly cooled to form the spinel. The spinel is crushed to 100–150 mesh.

Process 2

A predetermined amount of $FeCl_3 \cdot 6H_2O$ (corresponds to the predetermined wt % of $Fe_2O_3$) is dissolved in distilled water. A predetermined amount of $Bi(NO_3)_3 \cdot 5H_2O$ (corresponds to the predetermined wt % of $Bi_2O_3$) is dissolved in 5 ml 2N-$HNO_3$. The two solutions are mixed with stirring, and the powder of the spinel is rapidly sprayed into the mixture. Then the mixture is co-precipitated with phenolphthalein and $NH_4OH$. The precipitate is washed with water and dried for 1 hour at 100°–150° C.

Then the dried precipitate is formulated as cells 3–5 cm in diameter and 5–7 mm in height. The cells are dried again, and sintered for 10 hours at 1100° C. and rapidly cooled to form the composition of eutectic mixture catalysts.

Process 3

Thus-formed catalyst composition is placed in an oxidation furnace, and $Ce_2O_3$(stabilizer) is added, if necessary. Then ammonia-air mixture gas is supplied, and the temperature is raised at the rate of 100° C./hr. In each case of a 100° C. increase the raised temperature is maintained for 1 hour. The temperature is raised to 650° C. to activate the catalyst composition.

The following examples provide detailed embodiments of this invention. But, this invention is not limited by these examples.

EXAMPLE 1

$MnAl_2O_4$ spinel was used as carrier and concentrate of $Bi_2O_3$ was fixed at 3.5 wt % concentrates of $Fe_2O_3$ were varied as 10, 20, 30 and 40 wt %:

According to the typical processes mentioned above, 172.7 g of $MnAl_2O_4$ spinel was prepared from 169 g of $MnSO_4 \cdot H_2O$ and 750.26 g of $Al(NO_3)_3 \cdot 9H_2O$.

Then 63.97 g, 127.93 g, 191.91 g, 255.88 g of FeCl$_3$.6H$_2$O (corresponding to 17.27 g, 34.54 g, 57.81 g and 69.08 g of Fe$_2$O$_3$) were applied to produce the following catalyst compositions:

No. 1:10 wt % Fe$_2$O$_3$—MnAl$_2$O$_4$—3.5 wt % Bi$_2$O$_3$
No. 2:20 wt % Fe$_2$O$_3$—MnAl$_2$O$_4$—3.5wt % Bi$_2$O$_3$
No. 3:30 wt % Fe$_2$O$_3$—MnAl$_2$O$_4$—3.5 wt % Bi$_2$O$_3$
No. 4:40 wt % Fe$_2$O$_3$—MnAl$_2$O$_4$—3.5 wt % Bi$_2$O$_3$

The oxidation capacities of the above four catalyst compositions were tested under the following conditions.

Height of catalyst layer: 3 cm
layer: single layer
velocity of air-ammonia mixture gas
(concentration of ammonia is 7%): 345 liters per hour The results are shown in the Table 1.

TABLE 1

| catalyst | Oxidation ratio of NH$_3$ (%) reaction temperature | | | | | |
|---|---|---|---|---|---|---|
| | 420° C. | 520° C. | 620° C. | 720° C. | 820° C. | 920° C. |
| No. 1 | 58.55 | 84.51 | 93.93 | 91.67 | 65.50 | 33.93 |
| No. 2 | 79.14 | 90.00 | 98.09 | 92.36 | 69.13 | 41.23 |
| No. 3 | 71.38 | 81.65 | 89.49 | 86.06 | 56.47 | 26.47 |
| No. 4 | 68.33 | 77.54 | 82.16 | 63.73 | 35.43 | 17.86 |

While the concentration of Fe$_2$O$_3$ increases to 20%, the oxidation capacity of the catalyst increases. But as the concentration of Fe$_2$O$_3$ increases above 20%, the oxidation capacity decreases. Meanwhile, regardless of the concentration of Fe$_2$O$_3$, the capacity of catalyst increases in proportion to the increase of temperature. However, when the temperature increases over 620° C., the capacity rapidly decreases.

EXAMPLE 2

MnAl$_2$O$_4$ spinel was used as carrier, the concentration of Fe$_2$O$_3$ was fixed at 20% and the concentration of Bi$_2$O$_3$ was varied as 3.5, 4, 5, 6 wt %:

According to the typical processes mentioned above, 172.7 g of MnAl$_2$O$_4$ spinel was prepared from 169 g of MnSO$_4$.H$_2$O and 750.26 g of Al(NO$_3$)$_3$.9H$_2$O.

Then 13.77 g, 15.74 g, 19.67 g and 23.61 g of Bi(NO$_3$)$_3$.5H$_2$O (corresponding to 6.04 g, 6.91 g, 8.64 g and 10.36 g of Bi$_2$O$_3$) were separately applied to produce the following catalyst compositions:

No. 2: 20 wt % Fe$_2$O$_3$—MnAl$_2$O$_4$—3.5 wt % Bi$_2$O$_3$
No. 5: 20 wt % Fe$_2$O$_3$—MnAl$_2$O$_4$—4 wt % Bi$_2$O$_3$
No. 6: 20 wt % Fe$_2$O$_3$—MnAl$_2$O$_4$—5 wt % Bi$_2$O$_3$
No. 7: 20 wt % Fe$_2$O$_3$—MnAl$_2$O$_4$—6 wt % Bi$_2$O$_3$

The oxidation capacities of these catalyst compositions were tested under the conditions used in Example 1, and the results are illustrated in Table 2.

TABLE 2

| catalyst compositions | Oxidation ratio of NH$_3$ (%) reaction temperature | | | | | |
|---|---|---|---|---|---|---|
| | 420° C. | 520° C. | 620° C. | 720° C. | 820° C. | 920° C. |
| No. 2 | 79.14 | 90.00 | 98.09 | 92.36 | 69.13 | 41.23 |
| No. 5 | 73.93 | 84.66 | 94.97 | 86.04 | 66.23 | 35.00 |
| No. 6 | 72.30 | 81.39 | 88.01 | 82.33 | 57.55 | 30.04 |
| No. 7 | 60.09 | 75.57 | 81.56 | 70.23 | 46.42 | 23.38 |

EXAMPLE 3

20 wt % Fe$_2$O$_3$—MnAl$_2$O$_4$—3.5 wt % Bi$_2$O$_3$ catalyst composition, which was identified as the most favorable one in Examples 1 and 2, was used as the test catalyst composition. When the height of catalyst layer changed to 1.5 cm from 3 cm, the oxidation capacity increased to 99.04% from 98.09%.

And when the double and triple layers (height of layer: 1.5 cm) were applied, the oxidation capacity was increased to 99.55% in case of double layer. However, in case of triple layer the oxidation capacity decreases to 90.44%. The results are illustrated in table 3.

TABLE 3

| layer height | catalyst layer | | |
|---|---|---|---|
| | single | double | triple |
| 1.5 cm | 99.04 | 99.55 | 90.44 |
| 3 cm | 98.09 | — | — |

EXAMPLE 4

MgAl$_2$O$_4$ spinel was used as carrier, the concentration of Bi$_2$O$_3$ was fixed to 3.5 wt % and the concentration of Fe$_2$O$_3$ was varied as 10, 20, 30 and 40 wt %:

According to the typical processes, 142.27 g of MgAl$_2$O$_4$ spinel was prepared from 246.28 g of MgSO$_4$.7H$_2$O and 750.26 g of Al(NO$_3$)$_3$.9H$_2$O. Then 52.71 g, 105.42 g, 158.13 g and 210.84 g of FeCl$_3$.6H$_2$O (corresponding to 14.23 g, 28.46 g, 44.69 g and 56.92 g of Fe$_2$O$_3$) were separately applied to produce the following catalyst compositions:

No. 12: 10 wt % Fe$_2$O$_3$—MgAl$_2$O$_4$—3.5 wt % Bi$_2$O$_3$
No. 13: 20 wt % Fe$_2$O$_3$—MgAl$_2$O$_4$—3.5 wt % Bi$_2$O$_3$
No. 14: 30 wt % Fe$_2$O$_3$—MgAl$_2$O$_4$—3.5 wt % Bi$_2$O$_3$
No. 15: 40 wt % Fe$_2$O$_3$—MgAl$_2$O$_4$—3.5 wt % Bi$_2$O$_3$

The oxidation capacities of these catalyst compositions were tested under the conditions used in Example 1 and the results are illustrated in Table 4.

TABLE 4

| catalyst composition | oxidation ratio of NH$_3$ (%) reaction temperature | | | | | |
|---|---|---|---|---|---|---|
| | 420° C. | 520° C. | 620° C. | 720° C. | 820° C. | 920° C. |
| No. 12 | 57.73 | 84.45 | 94.15 | 92.00 | 64.70 | 34.80 |
| No. 13 | 79.28 | 90.08 | 98.18 | 93.11 | 69.16 | 41.56 |
| No. 14 | 72.47 | 81.50 | 89.53 | 86.04 | 56.67 | 26.57 |
| No. 15 | 68.16 | 77.40 | 82.19 | 63.56 | 35.51 | 17.77 |

As seen from the above table, an oxidation ratio of 98.18% is obtained from 20 wt % of Fe$_2$O$_3$.

This result is superior to the result of 98.09% in Example 1. This shows that the spinels play a role of carrier as well as assistant catalyst.

EXAMPLE 5

The catalyst compositions of Example 1 and 2 show the most favorable oxidation ratio of NH$_3$ for a catalyst layer height of 1.5 cm, double layers and a reaction temperature of 620° C. But when the temperature increases to 720° C., the oxidation ratio rapidly decreases.

In order to extend the effective temperature range and to maintain the duration of the catalyst function, 0.5 wt %, 1 wt %, 1.5 wt % and 2 wt % of Ce$_2$O$_3$ were added as stabilizer a 20 wt % Fe$_2$O$_3$—MnAl$_2$O$_4$—3.5 wt % Bi$_2$O$_3$ catalyst composition to produce the following catalyst compositions.

No. 8: 20 wt % Fe$_2$O$_3$—MnAl$_2$O$_4$—3.5 wt % Bi$_2$O$_3$—0.5 wt % Ce$_2$O$_3$
No. 9: 20 wt % Fe$_2$O$_3$—MnAl$_2$O$_4$—3.5 wt % Bi$_2$O$_3$—1 wt % Ce$_2$O$_3$

No. 10: 20 wt % Fe₂O₃—MnAl₂O₄—3.5 wt % Bi₂O₃—1.5 wt % Ce₂O₃

No. 11: 20 wt % Fe₂O₃—MnAl₂O₄—3.5 wt % Bi₂O₃—2 wt % Ce₂O₃

The oxidation capacities of these four compositions and the above No. 2 composition under the conditions of Example 1 are illustrated in Table 5.

TABLE 5

| catalyst composition | Oxidation ratio of NH₃ (%) reaction temperature | | | | | |
|---|---|---|---|---|---|---|
| | 420° C. | 520° C. | 620° C. | 720° C. | 820° C. | 920° C. |
| No. 2 | 84.19 | 95.60 | 99.55 | 94.97 | 84.90 | 57.86 |
| No. 8 | 86.74 | 97.62 | 99.75 | 99.58 | 99.77 | 67.24 |
| No. 9 | 82.20 | 87.62 | 96.28 | 96.28 | 95.94 | 63.29 |
| No. 10 | 76.71 | 82.27 | 91.92 | 91.87 | 91.86 | 55.27 |
| No. 11 | 68.05 | 77.16 | 87.81 | 87.83 | 87.81 | |

The graphic drawing of the above results is shown in FIG. 1. As we see the results, in the range of from 620°–820° C., the oxidizing capacities are not rapidly reduced and are nearly constant. In other words, the effective temperature ranges were extended to maintain the duration of the function of catalyst. This illustrates that, in the range of 620° to 820° C., Ce₂O₃ acts as a stabilizer for the Fe₂O₃—MnAl₂O₄—Bi₂O₃ series of catalyst compositions.

Meanwhile, when the concentration of Ce₂O₃ is 0.5 wt %, the best oxidation ratio (99.75%) is obtained it is higher than that for the catalyst compositions which do not comprise Ce₂O₃.

EXAMPLE 6

In order to establish more clearly that the spinel plays carrier role as well as that of catalyst assistant, the spinel component of the catalyst composition (No. 8), 20 wt % Fe₂O₃—MnAl₂O₄—3.5 wt % Bi₂O₃—0.5 wt % Ce₂O₃, was substituted by each of MgAl₂O₄, CaAl₂O₄, BaAl₂O₄ and SrAl₂O₄. Then according to the above-mentioned typical processes, the following catalyst compositions were produced; their oxidation capacity was tested under the optimum condition (catalyst layer height: 1.5 cm & double layer).

The results are illustrated in the table 6.

No. 16: 20 wt % Fe₂O₃—MgAl₂O₄—3.5 wt % Bi₂O₃—0.5 wt % Ce₂O₃

No. 17: 20 wt % Fe₂O₃—CaAl₂O₄—3.5 wt % Bi₂O₃—0.5 wt % Ce₂O₃

No. 18: 20 wt % Fe₂O₃—BaAl₂O₄—3.5 wt % Bi₂O₃—0.5 wt % Ce₂O₃

No. 19: 20 wt % Fe₂O₃—SrAl₂O₄—3.5 wt % Bi₂O₃—0.5 wt % Ce₂O₃

No. 8: 20 wt % Fe₂O₃—MnAl₂O₄—3.5 wt % Bi₂O₃—0.5 wt % Ce₂O₃

TABLE 6

| catalyst composition | Oxidation ratio of NH₃ (%) reaction temperature | | | | | |
|---|---|---|---|---|---|---|
| | 420° C. | 520° C. | 620° C. | 720° C. | 820° C. | 920° C. |
| No. 8 | 86.74 | 97.62 | 99.75 | 99.58 | 99.77 | 67.24 |
| No. 16 | 87.42 | 98.29 | 99.76 | 99.83 | 99.74 | 67.19 |
| No. 17 | 80.62 | 91.35 | 95.02 | 95.11 | 94.80 | 61.88 |
| No. 18 | 83.04 | 93.78 | 97.63 | 97.50 | 97.57 | 63.76 |

TABLE 6-continued

| catalyst composition | Oxidation ratio of NH₃ (%) reaction temperature | | | | | |
|---|---|---|---|---|---|---|
| | 420° C. | 520° C. | 620° C. | 720° C. | 820° C. | 920° C. |
| No. 19 | 83.71 | 91.92 | 95.58 | 95.69 | 95.33 | 61.83 |

Figure 2:
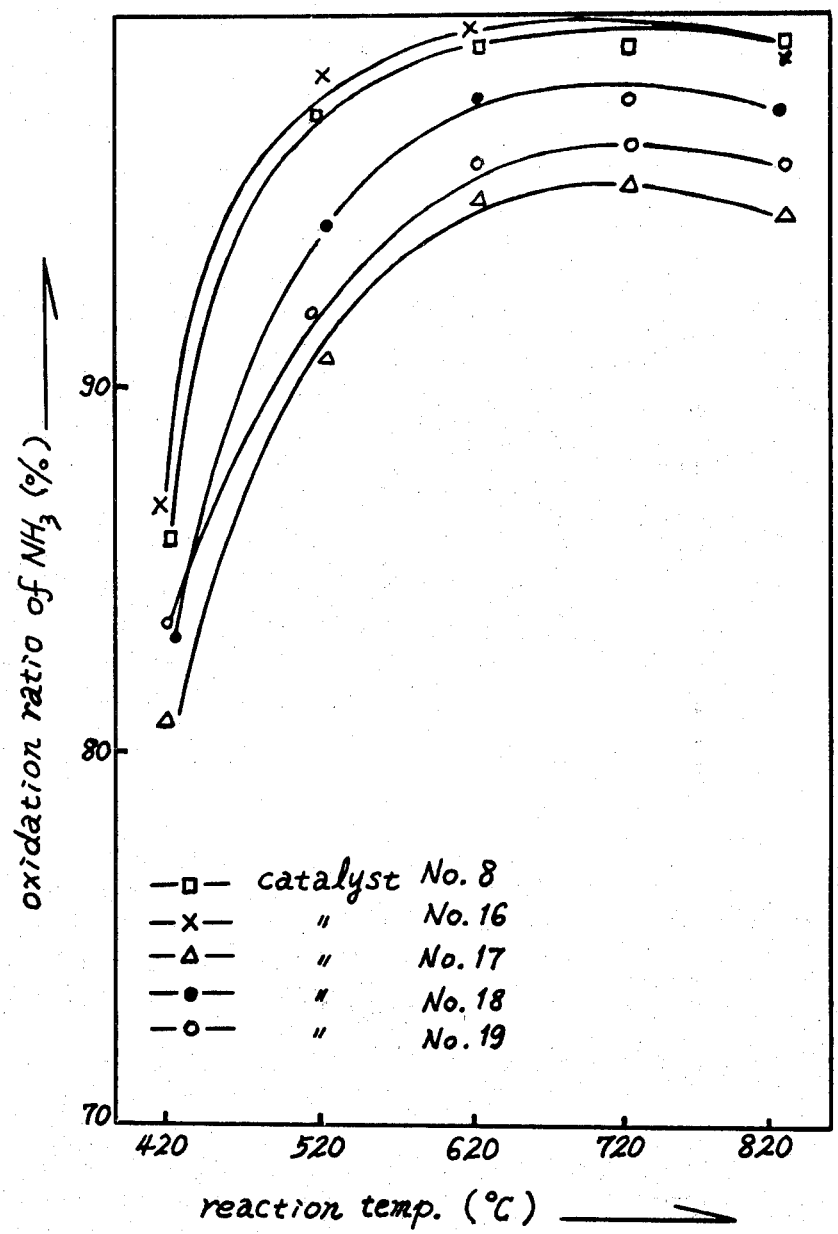
FIG. 2 graphically presents the results of Example 6 and the role of spinel.

The graphic drawing of the above results is shown in FIG. 2. As can be seen in FIG. 2, the compositions comprising the spinels of MgAl₂O₄ and MnAl₂O₄ show nearly the same oxidation capacity. On the other hand, the oxidation capacities of the spinels of CaAl₂O₄, BaAl₂O₄ and SrAl₂O₄, are somewhat reduced. This illustrates that the spinels play a role as carrier as well as catalyst assistant.

What we claim is:

1. A nonmetallic catalyst composition of the formula a Fe₂O₃—MAl₂O₄—b Bi₂O₃—c Ce₂O₃ wherein
   MAl₂O₄ is a spinel carrier,
   M is magnesium, manganese, calcium, strontium or barium,
   a is from 10 to 40 weight percent,
   b is from 3.5 to 6 weight percent, and
   c is from 0.5 to 2 weight percent,
   all percentages being based on the spinel.

2. A catalyst according to claim 1 wherein M is magnesium.

3. A catalyst according to claim 1 wherein M is manganese.

4. A catalyst according to claim 1 wherein M is calcium.

5. A catalyst according to claim 1 wherein M is strontium.

6. A catalyst according to claim 1 wherein M is barium.

7. A process of stabilizing an Fe₂O₃—MAl₂O₄—Bi₂O₃ catalyst composition, wherein M is magnesium, manganese, calcium, strontium or barium, and MAl₂O₄ is a spinel carrier, against temperature change which comprises incorporating therein a thermally-stabilizing amount of Ce₂O₃.

8. A process according to claim 7 wherein M is magnesium.

9. A process according to claim 7 wherein M is manganese.

10. A process according to claim 7 wherein M is calcium.

11. A process according to claim 7 wherein M is strontium.

12. A process according to claim 7 wherein M is barium.

13. A process according to claim 7 wherein the amount of Ce₂O₃ is from 0.5 to 2 weight percent, based on the spinel.

14. A process according to claim 13 wherein M is magnesium.

15. A process according to claim 13 wherein M is manganese.

16. A process according to claim 13 wherein M is calcium.

17. A process according to claim 13 wherein M is strontium.

18. A process according to claim 13 wherein M is barium.

* * * * *